(12) United States Patent
Humphrey

(10) Patent No.: US 11,822,407 B2
(45) Date of Patent: Nov. 21, 2023

(54) POWER FAULT DETECTION FOR COMPUTING DEVICE EXPANSION MODULES

(71) Applicant: Lenovo Global Technology (United States) Inc., Morrisville, NC (US)

(72) Inventor: Grason Humphrey, Research Triangle Park, NC (US)

(73) Assignee: Lenovo Global Technology (United States) Inc., Morrisville, NC (US)

(*) Notice: Subject to any disclaimer, the term of this patent is extended or adjusted under 35 U.S.C. 154(b) by 99 days.

(21) Appl. No.: 17/709,315

(22) Filed: Mar. 30, 2022

(65) Prior Publication Data
US 2023/0315178 A1   Oct. 5, 2023

(51) Int. Cl.
*G06F 1/00* (2006.01)
*G06F 1/28* (2006.01)
*H05B 47/105* (2020.01)

(52) U.S. Cl.
CPC ............. *G06F 1/28* (2013.01); *H05B 47/105* (2020.01)

(58) Field of Classification Search
CPC ................................ G06F 1/28; H05B 47/105
See application file for complete search history.

(56) References Cited

U.S. PATENT DOCUMENTS

| | | | |
|---|---|---|---|
| 8,607,095 B2* | 12/2013 | Chi | G06F 11/24 714/36 |
| 2012/0216083 A1* | 8/2012 | Windell | H04L 41/0645 714/57 |
| 2012/0290886 A1 | 11/2012 | Wilson, Jr. | |

\* cited by examiner

*Primary Examiner* — Nitin C Patel
(74) *Attorney, Agent, or Firm* — Olive Law Group, PLLC

(57) ABSTRACT

Systems and methods for use of magnets to retain and eject computing device expansion modules are disclosed. According to an aspect, a system includes a computing device that defines a slot for receipt of an expansion module for operable positioning of the expansion module with respect to the computing device. The expansion module comprises a first magnet attached thereto. Further, the system includes an electromagnet attached to the slot of the computing device. The system also includes a controller configured to apply an electrical output to the electromagnet such that the electromagnet generates a magnetic field for repelling the first magnet such the expansion module is urged in a direction for ejection from the slot.

20 Claims, 4 Drawing Sheets

POWER FAULT DETECTION FOR COMPUTING DEVICE EXPANSION MODULES

TECHNICAL FIELD

The presently disclosed subject matter relates generally to expansion modules of computing devices. Particularly, the presently disclosed subject matter relates to power fault detection for computing device expansion modules.

BACKGROUND

Servers are computers that provide functionality for other computing devices, referred to as clients. For example, a server can provide functionality such as computing resources among multiple clients and also access to stored data. Various types of servers include, application servers, database servers, file servers, email servers, and web servers. Server centers or clusters are collections of servers. Due to their important functions, there is a desire to optimize the performance of servers and to reduce the impact of component and expansion module failures on performance.

Power faults caused by expansion modules, such as dual in-line memory modules (DIMMs) and peripheral component interconnect express (PCIe) pluggable components, can be caused by a variety of common issues. Example issues include incorrectly installed components, damaged sockets, damaged pluggable components, debris in connectors, printed circuit board (PCB) manufacturing defects, and the like. Any of these issues and others can cause a power fault that prevents a server's motherboard or another type of computing device's circuit board from initializing (e.g., booting).

Power faults can be very difficult to diagnose, and often require the sequential removal of all board hardware to identify the issue. More particularly, one technique involves sequentially removing all pluggable expansion modules and applying alternating current (AC) power for each expansion module until the problem is identified. In another technique, software can be used to diagnose the problem, but this can only occur after system boot. In this technique, operating system (OS) boot is needed before failing components can be detected, meaning that it cannot detect power faults which stop the OS from booting. In another technique, a field programmable gate array of a server can detect which voltage rail is causing a power fault, but the same time-consuming processes must be used to identify the particular expansion module causing the power fault.

In view of the foregoing, there is a continuing need for improved systems and techniques for power fault detection.

BRIEF DESCRIPTION OF THE DRAWINGS

Figure 1:
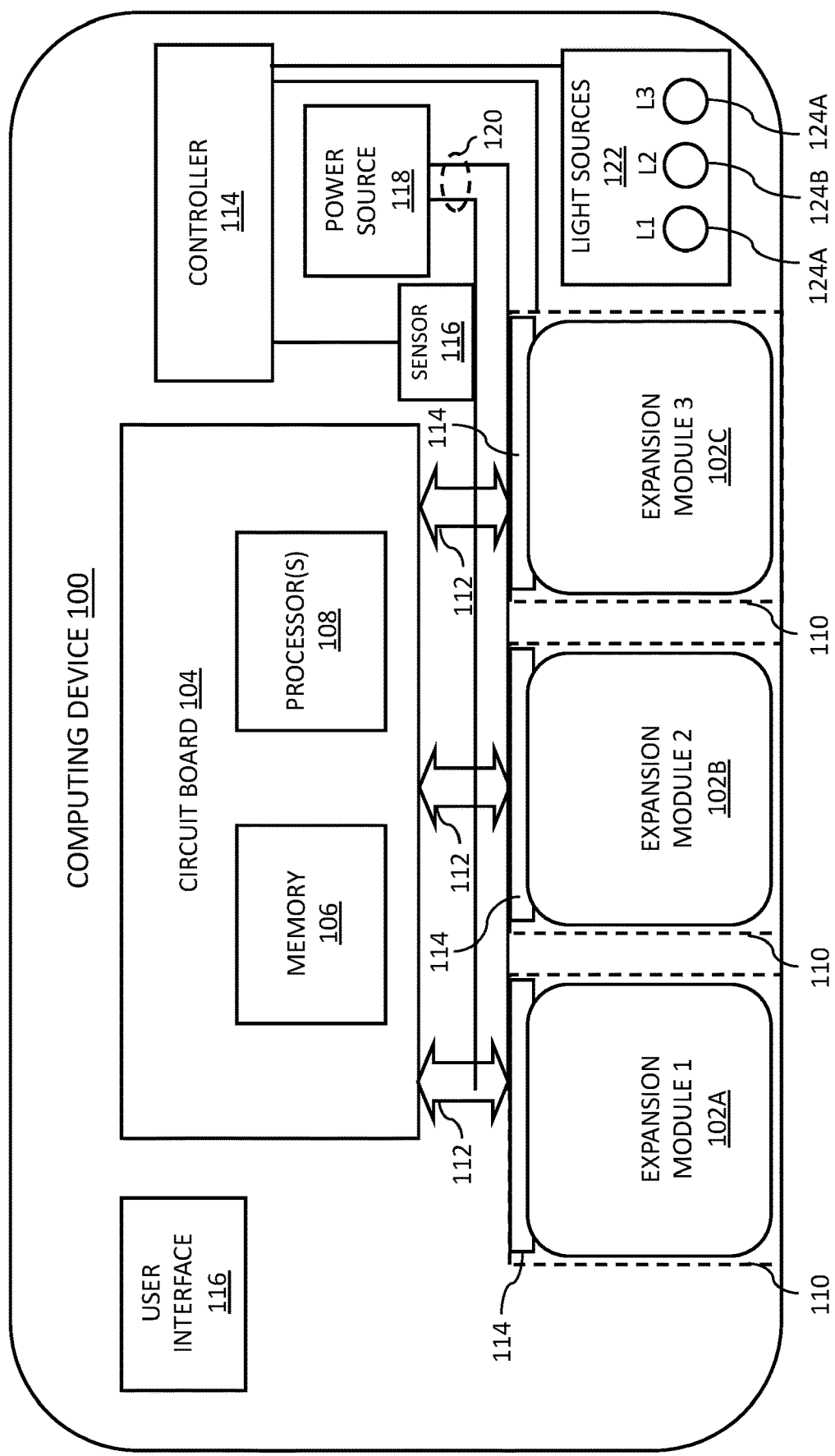
Figure 2:
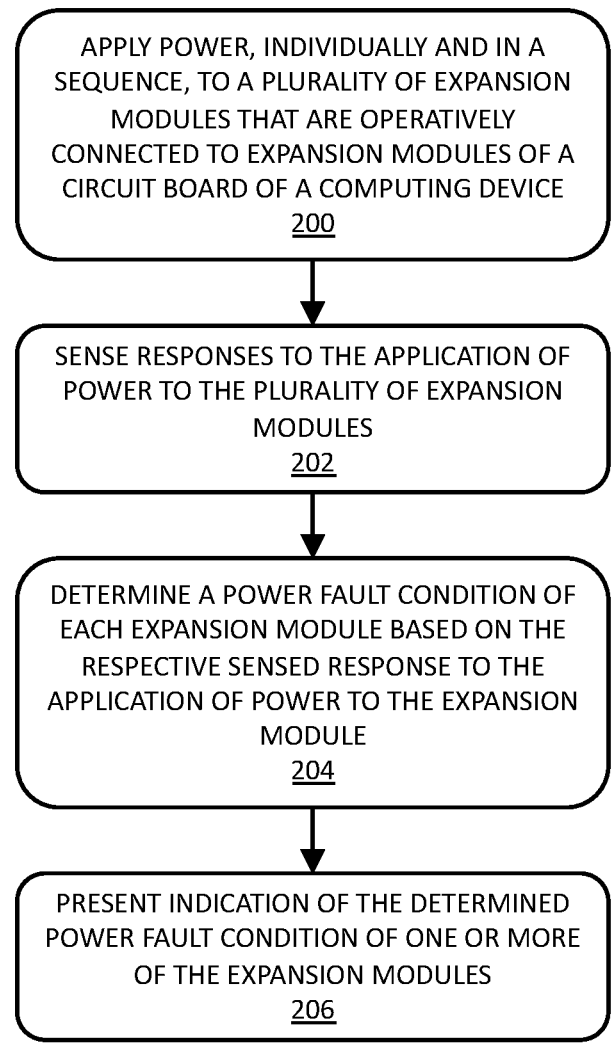
Figure 3:
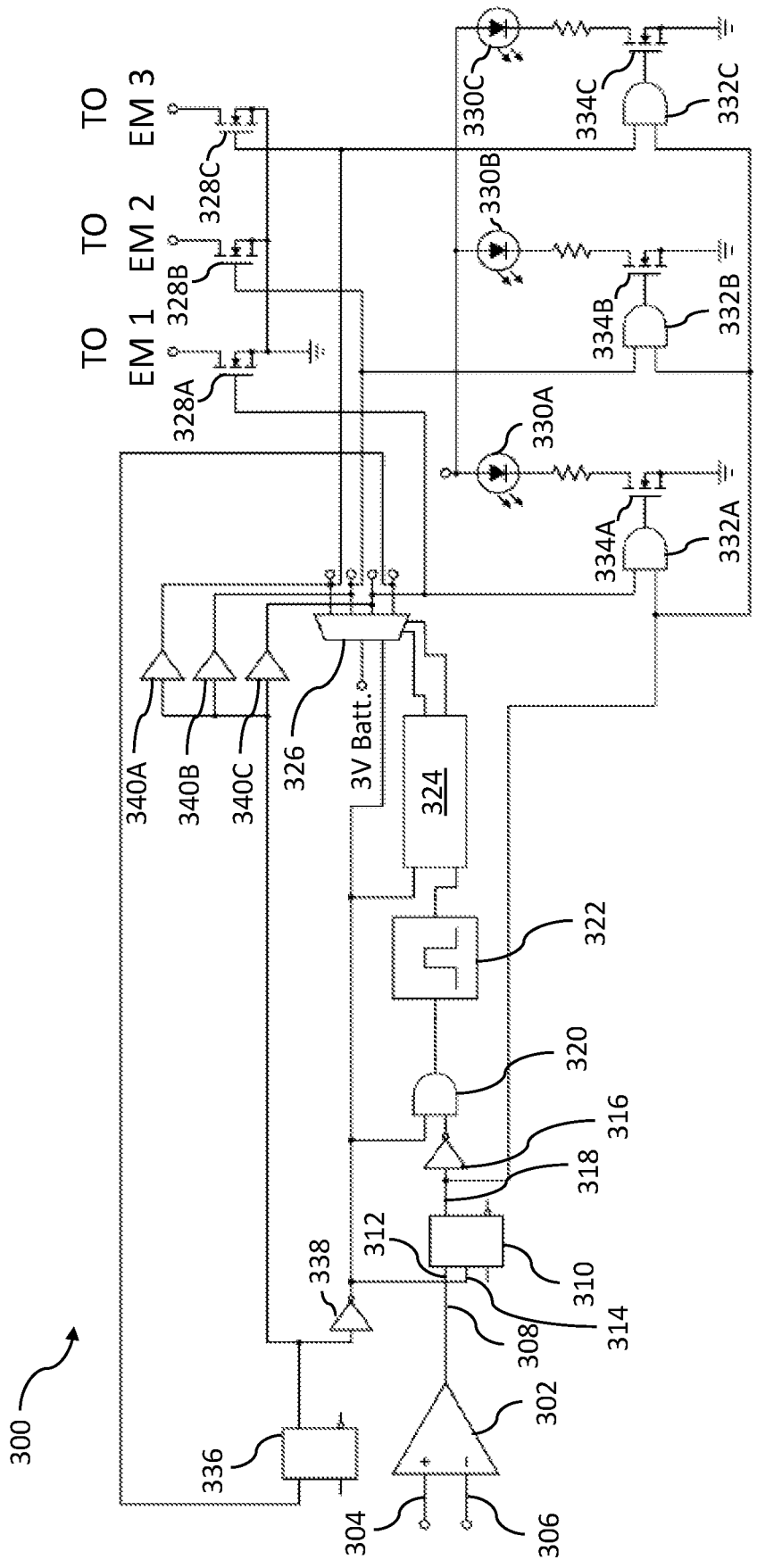
Figure 4:
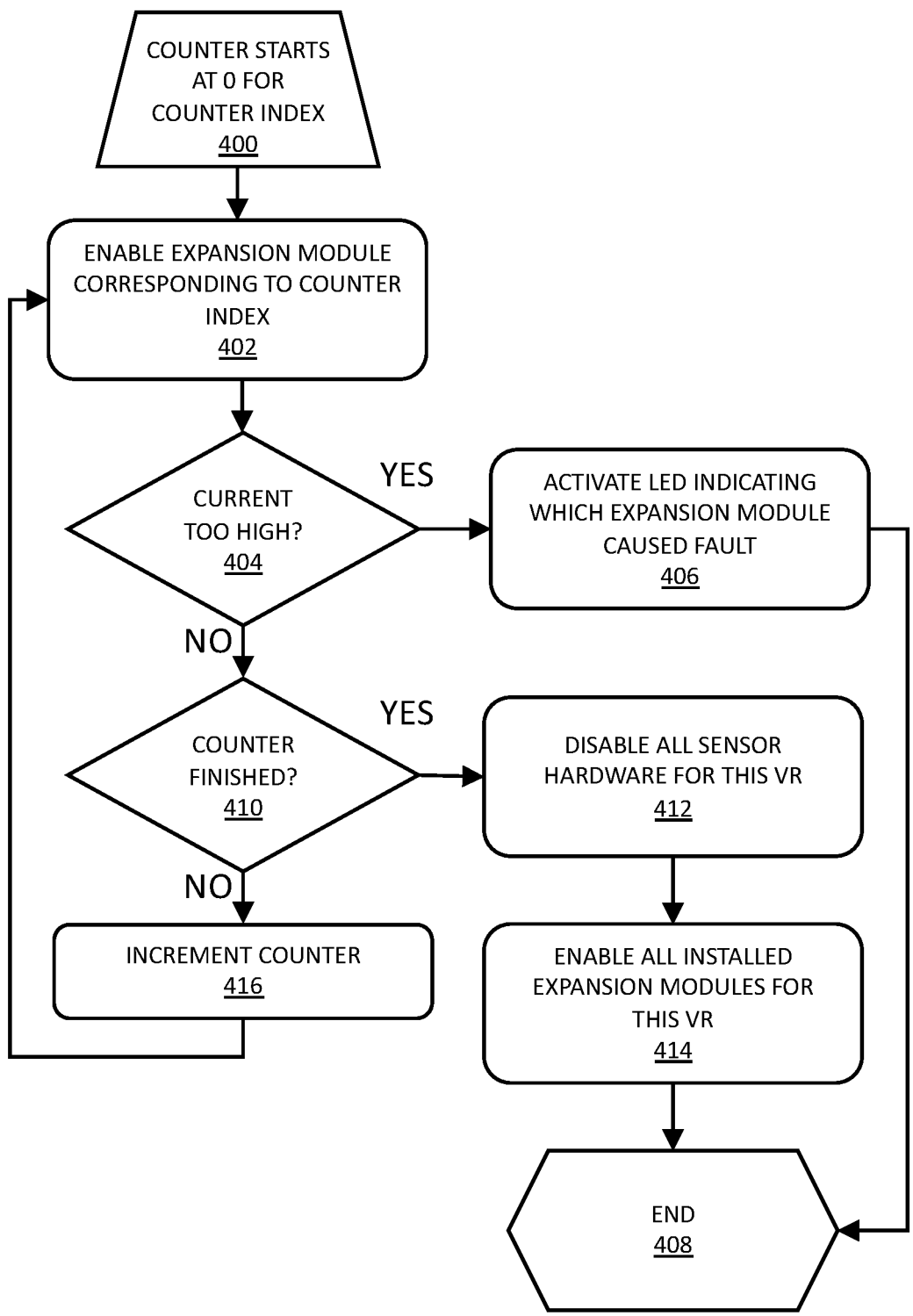

Having thus described the presently disclosed subject matter in general terms, reference will now be made to the accompanying Drawings, which are not necessarily drawn to scale, and wherein:

FIG. 1 is a schematic diagram of a system including a computing device configured to detect power faults for connected expansion modules in accordance with embodiments of the present disclosure;

FIG. 2 a flow diagram of an example method for determining a power fault condition of an expansion module and for presenting indication of the condition in accordance with embodiments of the present disclosure;

FIG. 3 is a circuit diagram of a controller for power fault detection for computing device expansion modules in accordance with embodiments of the present disclosure; and FIG. 4 is a flow diagram of another example method for determining a power fault condition of an expansion module and for presenting indication of the condition in accordance with embodiments of the present disclosure.

SUMMARY

The presently disclosed subject matter relates to power fault detection for computing device expansion modules. According to an aspect, a computing device includes a circuit board having expansion slots for operative connection to expansion modules. The computing devices also includes a sensor configured to sense responses to application of power to the expansion modules when the expansion modules are connected to the expansion slots. Further, the computing device includes a controller configured to enable and disable the application of power to the expansion modules. The controller is also configured to sequentially enable application of power to each expansion module in turn while application of power to the other expansion modules is disabled. Further, the controller is configured to determine a power fault condition of each expansion module based on the respective sensed response to the application of power to the expansion module. The controller is also configured to present indication of the determined power fault condition of one or more of the expansion modules.

According to another aspect, a method includes applying power, individually and in a sequence, to expansion modules that are operatively connected to expansion slots of a circuit board of a computing device. The method also includes sensing responses to the application of power to the expansion modules. Further, the method includes determining a power fault condition of each expansion module based on the respective sensed response to the application of power to the expansion module. The method also includes presenting indication of the determined power fault condition of one or more of the expansion modules.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

As used herein, the term "memory" is generally a storage device of a computing device. Examples include, but are not limited to, read-only memory (ROM) and random access memory (RAM).

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, the term "expansion module" should be broadly construed to be any electronic component or device that can be inserted into an expansion module slot of a computing device for operable connection to the computing device. Example expansion modules include, but are not limited to, hard drives, subscriber identification module (SIM) cards, a secure digital (SD) cards, wearable accessories, and the like. An expansion module can provide additional memory, processing, or other specialized functionality to a connected computing device. Expansion modules can allow the capabilities and interfaces of a computing device to be extended or supplemented in a way appropriate to the tasks it will perform. Expansion modules can be installed or removed in the field for allowing customization of the computing device for a particular purpose.

Unless otherwise defined, all technical terms used herein have the same meaning as commonly understood by one of ordinary skill in the art to which this disclosure belongs.

FIG. 1 illustrates a schematic diagram of a system including a computing device 100 configured to detect power faults for connected expansion modules 102A-102C in accordance with embodiments of the present disclosure. Referring to FIG. 1, the computing device 100 can be any electronic device configured to receive and connect to an expansion module for adding to the functionalities of the computing device 100. For example, the computing device 100 can be a server having multiple slots with electronic interfaces for receipt of and connection to expansion modules. In other examples, the computing device 100 can be a desktop computer, a laptop computing, a smartphone, a tablet computer, or any other suitable electronic device. Example expansion modules include, but are not limited to, hard drives, dual in-line memory modules (DIMMS), subscriber identification module (SIM) cards, a secure digital (SD) cards, and the like. An expansion module can provide additional memory, processing, or other specialized functionality to a connected computing device. In this example, 3 expansion modules are shown as being connected to the computing device 100, but it should be understood that any suitable number of expansion modules can be connected to a computing device that operates for detecting faults in accordance with the present disclosure.

The computing device 100 may be implemented in programmable hardware devices such as processors, digital signal processors, central processing units, field programmable gate arrays, programmable array logic, programmable logic devices, cloud processing systems, or the like. In the example of FIG. 1, the computing device 100 includes a circuit board 104 with memory 106 and one or more processors 108. As an example, the circuit board 104 may be a motherboard. The memory 106 may contain executable code as software for execution by the processor(s) 108. An executable code of a computing device may be a single instruction, or many instructions, and may even be distributed over several different code segments, among different applications, and across several memory devices. Similarly, operational data may be identified and illustrated herein within the computing device 100, and may be embodied in any suitable form and organized within any suitable type of data structure. The operational data may be collected as a single data set, or may be distributed over different locations including over different storage devices, and may exist, at least partially, as electronic signals on a system or network.

The expansion modules 102A-102C may each be sized and shaped to fit into their respective slots 110. The slot 104 may define an opening 110 such that the expansion module 102 may be received into the slot 104 and positioned as shown in FIG. 1 for operatively connecting to the computing device 100. More particularly, when received and positioned as shown in FIG. 1, the expansion modules 102A-102C can operably connect to the circuit board 104 for exchange of data via respective communication lines 112.

For operable connection with the computing device 100, an expansion module (e.g., one of expansion modules 102A-102C) is connected to a socket or other electrical connector 114 of the computing device 100 such that the circuitry of the expansion module can function with the computing device 100 via the socket 114 as will be understood by those of skill in the art. Further, the computing device 100 can include mechanisms for receiving and supporting the expansion module within the slot 110 in the position shown in FIG. 1.

The computing device 100 may include a user interface 116. The user interface 116 may be a display, a light emitting diode (LED) or other type of light, or the like for indicating a state or an operation of the computing device 100. For example, the circuit board 104 may be communicatively connected to the user interface 116 and configured to signal to the user interface 116 its present the state or operation.

The computing device 100 can provide power to expansion modules 102A-102C such that the expansion modules 102A-102C can function together with the computing device 100. In this example, the computing device 100 includes a power source 118 for supplying power to the expansion modules 102A-102C and other components of the computing device 100. A voltage rail or voltage regulator (VR) (generally designated by reference 120) can be connected to the power source 118 for transmission of electrical power for receipt by the expansion modules 102A-102C. During operation of the computing device 100, the power source 118 can provide electrical power to VR 120.

In accordance with embodiments, the computing device 100 includes a controller 114 configured to enable and disable the application of power to the expansion modules 102A-102C, sequentially enable application of power to each expansion module in turn while the application of power to the other expansion modules is disabled, determine a power fault condition of each expansion module based on a response to the application of power to the expansion module, and present indication of the determined power fault condition of one or more of the expansion modules. The controller 114 can be implemented by hardware, software, firmware, or combinations thereof. In an example, the controller 114 is implemented by The controller 114 is configured to individually activate or deactivate (i.e., turn on or off) each expansion module connected to the computing device 104. For example, the controller 114 can activate expansion module 102A while expansion modules 102B and 102C are not activated. Similarly, the controller 114 can activate expansion module 102B while expansion modules 102A and 102C are not activated, and the controller 114 can activate expansion module 102C while expansion modules 102A and 102B are not activated. As an example, the controller 114 can individually enable and disable the application of power from VR 120 to the expansion modules 102A-102C. In embodiments, the controller can send signals to power devices, such as FETs or E-fuses, that can control the application of power to each expansion module.circuitry.

The computing device 100 can include a sensor 116 configured to sense responses to application of power to the expansion modules 102A-102C when the expansion modules 102A-102C are connected to the expansion slots 110. Example sensors include, but are not limited to, current sensors, voltage sensors, thermal sensors, and the like. For example, the sensor 116 can be operatively connected to the VR 120 for sensing a current or other signal on VR 120. The controller 114 can be operatively connected to the sensor 116 for receiving an output from the sensor 116 that is representative of the sensed current or other signal. The controller 114 can determine a power fault condition of one of the expansion modules 102A-102C based on the output received from the sensor 116. For example, the controller 114 can compare a current level sensed at the VR 120 to a predetermined current level (e.g., a maximum current level) while one of the expansion modules 102A-102C is activated and the others are deactivated. The maximum current range can vary depending on expansion module type, but an example range is between about 5 and 10 Amps. In this example, if the sensed current level exceeds the maximum current level, then the controller 114 can determine that there is a power fault condition with respect to the activated expansion module. A voltage sensor can be used to detect an undervoltage condition that would result from a power fault on a pluggable component. A thermal sensor can be used to detect the increased temperature caused by an overcurrent condition.

It is noted that the response to activation of current can be sensed by the sensor 116 and efficiently processed by the controller 114. Efficient sensing and processing may be needed, in some instances, because the VR 120 providing power to the expansion modules may be shut down quickly (e.g., on the order of milliseconds) when an overcurrent condition is detected.

The controller 114 can be operatively connected to light sources 122 for presenting indication of a power fault condition of one or more of the expansion modules. For example, in response to determining a power fault condition of either of the expansion modules 102A-102C, the controller 114 can output a signal to the light sources 122 to activate one of the lights 124A-124C (also labeled L1-L3) to indicate a power fault condition. Each light 124A-124C may be associated with respective on of the expansion modules 102A-102C. In an example, the light 124A may be positioned near the slot 110 of expansion module 102A such that it is understood that the light 124A indicates whether there is a power fault condition for the expansion module 102 within its slot 110. Lights 124B and 124C can be similarly placed with respect to the slots of expansion modules 102B and 102C for indicating whether there is a power fault condition for one of the expansion modules 102B and 102C. In an example, the lights 124A-124C can be light emitting diodes (LEDs), but it should be understood that the lights 124A-124C may alternatively be any other suitable light source. Further, it is noted that the indication of a power fault condition of an expansion module may alternatively be indicated by any other suitable device or component such as a display.

The light sources 122 can be positioned such that an operator near the computing device 100 can readily see them for monitoring operational status of the computing device 100. After seeing one of the lights 124A-124C turn on, the operator can then recognize that the associated expansion slot 110 has an expansion module that has a power fault. Then the operator can take action by removing and replacing the faulty expansion module.

In this example, the controller 114 is described as being apart from the circuit board 104, but it should be understood that the controller 114 may alternatively be a part of the circuit board 104. In the case of the controller 114 being separate from the circuit board 104 (which may be a motherboard), the controller 114 can identify an expansion module causing a power fault without relying on the motherboard, an FPGA, or OS. For example, the controller 114 may be implemented with circuitry that generally operates separately from the motherboard, the FPGA, or OS of the computing device 100.

FIG. 2 illustrates a flow diagram of an example method for determining a power fault condition of an expansion module and for presenting indication of the condition in accordance with embodiments of the present disclosure. This example method is described as being implemented by the computing device 100 shown in FIG. 1, but it should be understood that the method may alternatively be implemented by any other suitable device or system having expansion modules.

Referring to FIG. 2, the method includes applying 200 power, individually and in a sequence, to a plurality of expansion modules that are operatively connected to expansion slots of a circuit board of a computing device. For example, subsequent to the expansion modules 102A-102C being positioned in their respective slots 110, the controller 114 can control the application of power, individually and in a sequence, to the expansion modules 102A-102C. Particularly, for example, the controller 114 can be individually signal the expansion modules 102A-102C to activate one at a time. This can occur while power source 118 is applying electrical power to VR 120.

The method of FIG. 2 includes sensing 202 responses to the application of power to the plurality of expansion modules. Continuing the aforementioned example, the sensor 116 can continuously sense current on VR 120 as the controller 114 individually activates the expansion modules 102A-102C. The current on the VR 120 may change as each expansion module is activated. The sensor 116 can output signals to the controller 114 that are representative of the sensed current. As a result, the controller 114 can receive signals indicative of the response of the expansion modules 102A-102C to their individual activation in sequence.

The method of FIG. 2 includes determining 204 a power fault condition of each expansion module based on the respective sensed response to the application of power to the expansion module. Continuing the aforementioned example, the controller 114 can determine a power fault condition of each expansion module 102A-102C based on the respective sensed response to the application of power to the expansion module 102A-102C. For example, the controller 114 can compare a current level sensed at the VR 120 to a maximum current level while one of the expansion modules 102A-102C is activated and the others are deactivated. In this example, if the sensed current level exceeds the maximum current level, then the controller 114 can determine that there is a power fault condition with respect to the activated expansion module.

The method of FIG. 2 includes presenting 206 indication of the determined power fault condition of one or more of the expansion modules. Continuing the aforementioned example, the controller 114 can maintain the lights 124A-124C as turned off during a normal operation state. In response to the controller 114 determining a power fault condition of one of the connected expansion modules, then the controller can control the corresponding light (124A, 124B, or 124C) to turn on or activate to thereby indicate the power fault condition and identify the expansion module or the slot holding the expansion module. In an example, the controller 114 can output a signal to the light sources 122 to activate one of the lights 124A-124C (also labeled L1-L3) to indicate a power fault condition. As a result, an operator or user of the computing device can quickly and efficiently be notified of a particular expansion module with a power fault.

FIG. 3 illustrates a circuit diagram of a controller 300 for power fault detection for computing device expansion modules in accordance with embodiments of the present disclosure. In an example, the controller 300 can be the controller 114 for the computing device 100 as shown in FIG. 1. Referring to FIG. 3, the controller 300 includes a comparator 302 for comparing a current level sensed at a VR (e.g., VR 120 in FIG. 1) to a maximum current level. Particularly, positive (+) input 304 is operatively connected to a sensor (e.g., contact) on the VR for receipt of the current on the VR. Negative (−) input 306 of the comparator 302 is operatively connected to a voltage input corresponding to the maximum current level. The current sensor can output an analog voltage that corresponds to the current it senses. This can then be compared against the voltage the current sensor outputs given the maximum allowable current, which can be set in a variety of ways, such as with a resistor voltage divider. The maximum allowable current can be set slightly higher than the maximum current draw of any single device on the VR that is being tested. The comparator 302 can compare the two currents into inputs 304 and 360 and output a signal at output 308 to indicate whether the current input at input 304 from VR is greater than the maximum current level at input 306. The maximum current level is set such that when the VR current is greater, then a power fault condition has been detected among at least one of the expansion modules. As described herein, the controller 300 sequences through the expansion modules to activate each in turn so that a power fault condition can be detected when an activated one of the expansion modules causes the current on the VR to be greater than the maximum current level (i.e., overcurrent detected on VR).

The controller 300 includes a set-reset latch 310 configured to latch in response to detection of a power fault condition detected by the comparator 302. Particularly, a set input 312 of the latch 310 is connected to the output 308 of the comparator 302 for setting to the output 308 when the output 308 is high. The latch 310 include an enable input 314 that can receive an input for disabling the set input 312. An inverter 316 is connected to the Q output 318 of the latch 310 for outputting a logical negation of the input of the inverter 316.

An input of an AND gate 320 receives the output of Q output 318. The other input to the AND gate 320 is the inverse of the "finished" signal coming from 336. Therefore, if the process is not finished, that input to the AND gate is high. The output of the AND gate 320 is connected to a square wave generator 322 for enabling output of a square wave by the generator 322 for receipt by an N-Bit counter 324. As a result, an N-Bit counter 324 can individually and in sequence (or cycle) through the expansion modules (e.g., expansion modules 102A-102C in FIG. 1). Particularly, the output of the counter 324 is connected to a clock (CLK) input of the counter 324 for controlling the counter to increment by one for each input square wave. Outputs (Out0 and Out1) of the counter 324 are connected to a demultiplexer 326 for individually controlling application of power to expansion modules. In this example, MOSFETs 328A-328C are individually controlled by the demultiplexer 326 for controlling outputs to expansion modules (indicated EM1, EM2, and EM3, respective). Input can be provided to the demultiplexer as a binary number, which selects a single output of the demultiplexer. This output then allows power to be applied to a single expansion module via MOSFETs 328A-C.

The controller 300 includes several LEDs 330A-330C to individually activate based on a determined power fault condition of a respective expansion module. For example, LED 330A is activated in response to detection of a power fault condition for EM1, LED 330B is activated in response to detection of a power fault condition for EM2, and LED 330C is activated in response to detection of a power fault condition for EM3. LEDs 330A-330C are individually controlled based on inputs to AND gates 332A-332C, respectively, and MOSFETs 334A-334C. The AND gates 332A-332C require both inputs to be high to activate its respective LED. Each AND gate connected to an LED 332A-332C has one input connected to a demultiplexer output and one input connected to Q output 318, which goes high when a fault is detected. For an LED to be turned on to indicate a power fault on a specific expansion module, both inputs are high. This means that to be activated indicating a fault: 1) The demultiplexer output controlling power to the expansion module the LED corresponds to must be high, and 2) A fault must be detected, meaning that 318 is high. Only one demultiplexer output can be high at a time, meaning that only the LED corresponding to the expansion module that caused the power fault is turned on.

The controller 300 further includes another set-reset latch 336, another inverter 338, and unidirectional buffers 340A-340C. Latch 336 stores the state of the system as finished by being set when the demultiplexer finishes checking all expansion modules. Inverter 338 can disable all detection circuitry when the system has finished checking all expansion modules. Buffers 340A-C allow one-way data transfer so that all expansion modules can have their power enabled by a single input from latch 336 when testing is complete, but the signals from the demultiplexer does not interfere with each other while testing is occurring. There are a variety of ways to accomplish this, including dedicated buffer ICs, Op-Amps, Optoisolators, Logic gates, etc.

FIG. 4 illustrate a flow diagram of another example method for determining a power fault condition of an expansion module and for presenting indication of the condition in accordance with embodiments of the present disclosure. This example method is described as being implemented by the controller 300 shown in FIG. 3, but it should be understood that the method may alternatively be implemented by any other suitable circuitry or hardware.

Referring to FIG. 4, the method can initialize with a counter starting 400 at 0 (zero) for its counter index. For example, the counter 324 can be initialized at 0. Subsequently, the method includes enabling (or activating) 402 the expansion module corresponding to the counter index. Continuing the example, the counter 324 operates to individually address the expansion modules EM1-EM3. At step 402, only the particular expansion module addressed by the counter index of the counter 324 is activated. Thus, the expansions modules are individually addressed and activated.

Subsequently, the method includes determining 404 whether the current is too high. Continuing the aforementioned example, the comparator 302 compares the two currents into inputs 304 and 360 and outputs a signal at output 308 to indicate whether the current input at input 304 from VR is greater than the maximum current level at the input 306. In response to determining that the current is too high, the method proceed to step 406.

At step 406, the method includes activating the LED indicating which expansion module caused fault. Continuing the aforementioned example, the controller 300 can individually activate LEDs 330A-330C based on a determined power fault condition of a respective expansion module. Particularly, if the current on the VR exceeds the predetermined maximum level, the controller 300 can determine this condition and activate the LED corresponding to the expansion module that caused the overcurrent. Subsequently, the method can end at step 408, because the expansion module with the power fault has been determined and identified.

In response to determining that the current is not too high at step 404, the method proceeds to step 410. At step 410, the method includes determining whether the counter has finished. Particularly, the method includes determining whether the determining step 404 has been conducted for each expansion module. Continuing the aforementioned example, the counter 324 can indicate that the last expansion module in the sequence has been reached, and in this case the counter is finished. In response to determining that the counter is finished, the method may proceed to step 412.

At step 412, the method includes disabling all sensor hardware for this VR. Particularly, the controller 300 may no longer receive or control the sensor on the VR to receive current readings from the VR. Further, the method includes enabling (or activating) 414 all installed expansion modules on this VR. In this example of FIG. 1, expansion modules 102A-102C may be activated in this case since none were determined to have a power fault. Subsequently, the method may end at step 408.

Returning to step 410, the method may proceed to step 416 in response to determining the counter is not finished. At step 416, the method includes incrementing the counter. Continuing the aforementioned example, the counter 324 can be incremented so that determining of the current response for the next expansion module in the sequence may commence. Subsequently, the method may proceed to step 402 for enabling the expansion module that is next in the sequence and so forth until it is determined that the counter is finished at step 410.

In accordance with embodiments, the controllers and methods disclosed herein can detect the momentary overcurrent condition that occurs when an expansion module causes a power fault. It is noted that this detection should be performed quickly, because the VR providing the voltage to the expansion module can shut down in a few milliseconds when the overcurrent condition is detected. The disclosed controllers and methods can detect such overcurrent quickly and identify the expansion module that caused the overcurrent condition. An operator can recognize the expansion module causing the issue based on an associated light source, for example. Then the operator can take action to remedy the issue by replacing or repairing the faulty expansion module.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A computing device comprising:
    a circuit board comprising a plurality of expansion slots for operative connection to a plurality of expansion modules;
    a sensor configured to sense responses to application of power to the plurality of expansion modules when the plurality of expansion modules are connected to the plurality of expansion slots; and
    a controller configured to:
    enable and disable the application of power to the expansion modules;
    sequentially enable application of power to each expansion module in turn while application of power to the other expansion modules is disabled;
    determine a power fault condition of each expansion module based on the respective sensed response to the application of power to the expansion module; and
    present indication of the determined power fault condition of one or more of the expansion modules.

2. The computing device of claim 1, wherein the circuit board is a motherboard of a server.

3. The computing device of claim 1, wherein the expansion modules comprise one of hard drives, dual in-line memory modules (DIMMs), subscriber identification module (SIM) cards, and secure digital (SD) cards.

4. The computing device of claim 1, wherein the computing device comprises a voltage rail configured to provide power to the plurality of expansion modules while connected to the plurality of expansion slots, and
  wherein the sensor is operatively connected to the voltage rail for sensing the responses to application of power to the plurality of expansion modules.

5. The computing device of claim 4, wherein the sensor is configured to sense a current on the voltage rail, and
  wherein the controller is configured to determine the power fault condition based on the sensed current.

6. The computing device of claim 5, wherein the controller is configured to:
  for each application of power to the expansion modules, compare the sensed current to a predetermined current level; and
  determine a power fault condition of each expansion module based on each application of power.

7. The computing device of claim 1, wherein the controller comprises circuitry configured to individually address each of the expansion modules for controlling the application of power to the expansion modules.

8. The computing device of claim 7, wherein the computing device comprises a voltage rail configured to provide power to the plurality of expansion modules while connected to the plurality of expansion slots, and
  wherein the circuitry is configured to control the application of power from the voltage rail to the expansion modules.

9. The computing device of claim 1, further comprising a plurality of light sources that are each associated with a respective expansion module among the plurality of expansion modules, and
  wherein the controller is operatively connected to the light sources and configured to activate one of the light sources based on the determined power fault condition of the expansion module associated with the one of the light sources.

10. The computing device of claim 1, wherein the circuitry is configured to activate one of the light sources based on the determined power fault condition of its respective expansion module and the application of power to its respective expansion module.

11. A method comprising:
  applying power, individually and in a sequence, to a plurality of expansion modules that are operatively connected to expansion slots of a circuit board of a computing device;
  sensing responses to the application of power to the plurality of expansion modules;
  determining a power fault condition of each expansion module based on the respective sensed response to the application of power to the expansion module; and
  presenting indication of the determined power fault condition of one or more of the expansion modules.

12. The method of claim 11, wherein the circuit board is a motherboard of a server.

13. The method of claim 11, wherein the expansion modules comprise one of hard drives, dual in-line memory modules (DIMMs), subscriber identification module (SIM) cards, and secure digital (SD) cards.

14. The method of claim 11, wherein applying power comprises using a voltage rail of the computing device to provide power to the plurality of expansion modules while connected to the plurality of expansion slots, and
  wherein the method further comprises using a sensor to sense the responses to application of power to the plurality of expansion modules, wherein the sensor is operatively connected to the voltage rail.

15. The method of claim 14, further comprising using the sensor to sense a current on the voltage rail, and
  wherein the method further comprises determining the power fault condition based on the sensed current.

16. The method of claim 15, further comprising:
  comparing, for each application of power to the expansion modules, the sensed current to a predetermined current level; and
  determining a power fault condition of each expansion module based on each application of power.

17. The method of claim 11, wherein determining a power fault condition comprises individually addressing each of the expansion modules for controlling the application of power to the expansion modules.

18. The method of claim 17, further comprising using a voltage rail of the computing device to provide power to the plurality of expansion modules while connected to the plurality of expansion slots, and
  wherein determining the power fault condition comprises controlling the application of power from the voltage rail to the expansion modules.

19. The method of claim 11, further comprising activating a light source among a plurality of light sources associated with the expansion modules based on the determined power fault condition of the expansion module associated with the activated light source.

20. The method of claim 11, further comprising activating a light source among a plurality of light sources associated with the expansion modules based on the determined power fault condition of its respective expansion module and the application of power to its respective expansion module.

* * * * *